(12) United States Patent
Zeng (10) Patent No.: US 8,704,887 B2
(45) Date of Patent: Apr. 22, 2014

(54) MULTI-OBJECT APPEARANCE-ENHANCED FUSION OF CAMERA AND RANGE SENSOR DATA

(75) Inventor: Shuqing Zeng, Sterling Heights, MI (US)

(73) Assignee: GM Global Technology Operations LLC, Detroit, MI (US)

(\*) Notice: Subject to any disclaimer, the term of this patent is extended or adjusted under 35 U.S.C. 154(b) by 709 days.

(21) Appl. No.: 12/959,168

(22) Filed: Dec. 2, 2010

(65) Prior Publication Data
US 2012/0140061 A1    Jun. 7, 2012

(51) Int. Cl.
*H04N 7/18* (2006.01)
(52) U.S. Cl.
USPC .............................. 348/135; 382/100; 382/104
(58) Field of Classification Search
None
See application file for complete search history.

(56) References Cited

U.S. PATENT DOCUMENTS

2008/0253606 A1\* 10/2008 Fujimaki et al. .............. 382/100
2009/0067675 A1\*  3/2009 Tan et al. ...................... 382/104

\* cited by examiner

*Primary Examiner* — Sath V Perungavoor
*Assistant Examiner* — Dakshesh Parikh
(74) *Attorney, Agent, or Firm* — Parks IP Law LLC; Mickki D. Murray, Esq.

(57) ABSTRACT

A transportation vehicle configured to track an object external to the vehicle. The vehicle includes a camera, a range sensor, and an on-board computer. The on-board computer includes a processor and a tangible, non-transitory, computer-readable medium comprising instructions that, when executed by the processor, cause the processor to perform select steps. The steps include determining that new-object data corresponding to the object is available based on input received from the sensor sub-system of the vehicle. The steps also include registering the new-object data and estimating an expected location and an expected appearance for the object according to a prediction algorithm to generate a predicted track corresponding to the object. The steps also include analyzing motion for the object including comparing the predicted track with any existing track associated with the object and stored in a database of the on-board computer.

18 Claims, 7 Drawing Sheets

Fig_2

MULTI-OBJECT APPEARANCE-ENHANCED FUSION OF CAMERA AND RANGE SENSOR DATA

TECHNICAL FIELD

The present disclosure relates generally to methods and systems for automatically tracking objects and, more particularly, to methods and systems for improved tracking of objects using a camera, a range sensor, and computer-implemented fusing algorithms.

BACKGROUND

Many modern vehicles include a relatively-low-cost range sensor, such as an ultra-wide band short-range radar. Range sensors are generally orientated in a longitudinal direction in the front and/or rear of a vehicle, and satisfactorily determine a distance from the sensor to objects, such as other vehicles. Despite this reasonable performance for longitudinal sensing, range sensors have limited resolution in lateral measurements because of their relatively small aperture size. Thus, while helpful for determining a distance by which the host vehicle is behind another vehicle or other object ahead in a same lane, they are not as helpful for gauging kinematical characteristics of a vehicle that is in an adjoining lane.

Also, because range sensors typically track only one or two points per object, they often confuse objects that are close to each other, such as two vehicles crossing as they switch lanes.

Many modern vehicles include a vision system including at least one camera. In one example, a monocular camera has a good amount of pixels (e.g., 640 pixels) spread across a relatively-small field-of-view (e.g., 50 degrees). The camera is often directed toward a blind-spot area, such as adjacent or behind the host vehicle, for providing visual information to a driver. Such cameras, though, are not relied on for accurate measurements of longitudinal range. Efforts have been made to estimate range to an object by using a camera to detect a bottom part of the object adjacent the ground and assuming that the ground is always flat. This approach, though, does not reliably yield accurate results because the ground is of course rarely actually flat due to factors such as water-drainage gradients, inclines, declines, varying vehicle-pitch angle, occlusion of objects, and super-elevations (e.g., highway turn banks).

SUMMARY

The present disclosure relates to a transportation vehicle configured to track an object external to the vehicle. The vehicle includes a camera, a range sensor, and an on-board computer. The on-board computer includes a processor and a tangible, non-transitory, computer-readable medium comprising instructions that, when executed by the processor, cause the processor to perform select steps. The steps include determining that new-object data corresponding to the object is available based on input received from the sensor sub-system of the vehicle. The steps also include registering the new-object data and estimating an expected location and an expected appearance for the object according to a prediction algorithm to generate a predicted track corresponding to the object. The steps also include analyzing motion for the object including comparing the predicted track with any existing track associated with the object and stored in a database of the on-board computer.

The present disclosure also relates to a method for fusing camera and range sensor data to track at least one external object in a vehicle having a sensor subsystem, including a camera and a range sensor, and an on-board computer. The method includes the on-board computer determining that new-object data corresponding to the object is available based on input received from the sensor sub-system of the vehicle. The method also includes the on-board computer registering the new-object data, and estimating an expected location and an expected appearance for the object according to a prediction algorithm to generate a predicted track corresponding to the object. The method further includes the on-board computer analyzing motion for the object including comparing the predicted track with any existing track associated with the object and stored in a database of the on-board computer.

The present disclosure further relates to a computer-readable medium comprising instructions that, when executed by the processor, cause the processor to perform steps including determining that new-object data corresponding to the object is available based on input received from the sensor sub-system of the vehicle. The instructions also cause the processor to register the new-object data and estimate an expected location and an expected appearance for the object according to a prediction algorithm to generate a predicted track corresponding to the object. The instructions also cause the processor to analyze motion for the object including comparing the predicted track with any existing track associated with the object and stored in a database of the on-board computer.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like.

I. Overview

The present disclosure describes methods and systems for fusing output from various components of a sensing subsystem of a vehicle, such as from at least one vehicle-mounted camera and at least one vehicle-mounted range sensor.

For more robust vision tracking, the present disclosure includes a fusion method integrating motion information sensed by the camera with comparatively linear range data from the range sensor, and an incremental learning method updating attribute, such as target object appearance, of tracks in a database.

As described in further detail below, methods of the present disclosure include extraction of objects from data streams of the camera and the range sensor. The methods also include classifying the objects into predefined categories, such as vehicle, motorcycle, and pedestrian, according to image-based properties. The method further includes tracking the objects using motion-estimation techniques.

The methods and systems also include automatic update of radar and camera registration parameters, such as pitch angle.

Although the present invention is primarily described, by way of example, with respect to camera and radar sensors, the general concepts of the present disclosure can be used to fuse output from various types of sensors for achieving improved representations of the environment surrounding the vehicle.

II. On-Board Computing Architecture

Figure 1:
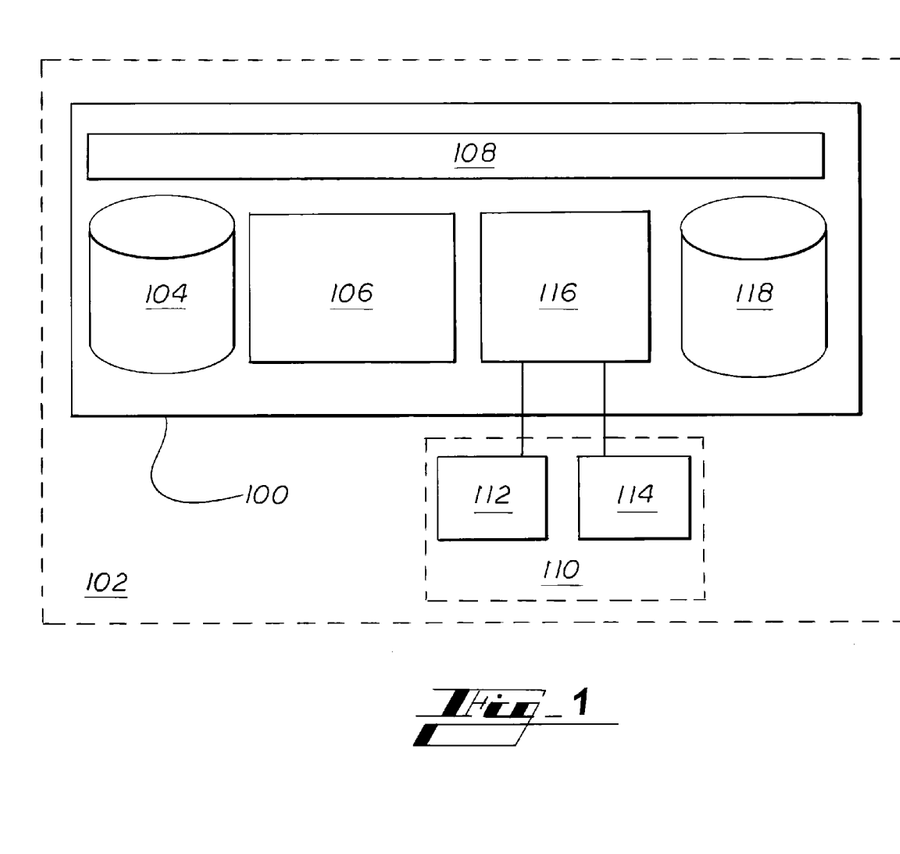
FIG. 1 illustrates an on-board computer architecture, according to an embodiment of the present disclosure.

Turning now to the figures, and more particularly the first figure, FIG. 1 illustrates an on-board computer (OBC) 100 of a subject, or host vehicle 102, according to an embodiment of the present disclosure. The OBC 100 includes a computer-readable storage medium, or memory 104 and a processor 106 in communication with the memory 104 via a data bus 108. The memory 104 includes one or more storage modules storing computer-readable instructions executable by the processor 106 to perform the functions of the OBC 100 described herein.

The OBC 100 also includes a sensor sub-system 110. In some embodiments, the sensor sub-system 110 includes at least one camera 112 and at least one range sensor 114, such as a radar. The camera 112 may include a monocular camera, and the range sensor 114 may include a short-range radar (SRR), an ultrasonic sensor, or a Light Detection And Ranging (LIDAR) sensor, for example. The OBC 100 also includes one or more network interfaces 116 connecting the processor 106, by way of the data bus 108, to (i) the sensor sub-system 110, (ii) other vehicle sub-systems (not shown), and in some cases, (iii) wireless communication networks (not shown), such as global positioning systems (GPS) networks and cellular telecommunication networks.

The OBC 100 also includes a database 118 storing files, or tracks corresponding to various salient objects sensed by the sensor sub-system 110 and stored in the database 118 by the processor 106, according to the teachings of the present disclosure. Although the track database 118 and the memory 104 are shown separately, the track database 118 and memory 104 are, in some embodiments, parts of the same medium.

III. Track Generation

Figure 2:
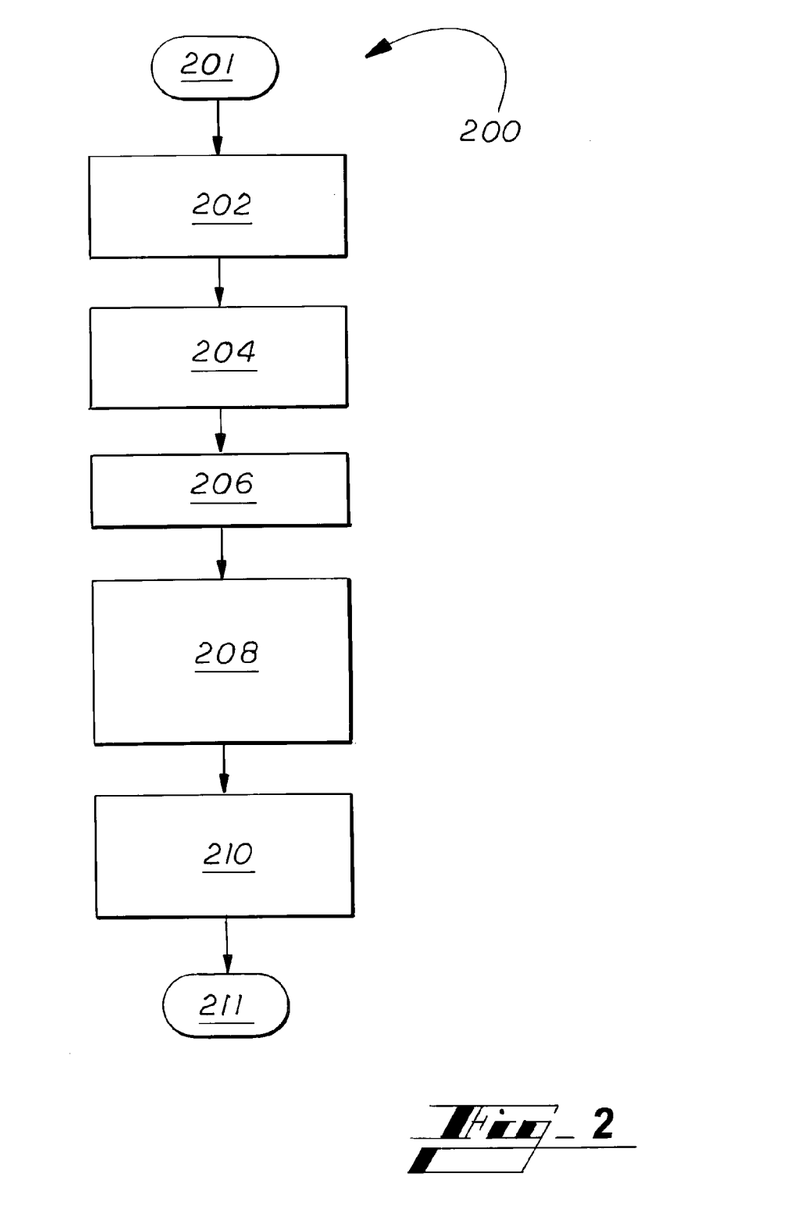
FIG. 2 illustrates a method for creating object tracks, according to an exemplary embodiment of the present disclosure.

FIG. 2 shows a method 200 for generating files, or tracks corresponding to sensed objects, according to an exemplary embodiment of the present disclosure. The method 200 for creating a track may be performed in response to the processor 106, executing the computer-readable instructions stored in the memory 104, determining that an object (e.g., leading vehicle) is being detected for a first time.

It should be understood that the steps of the method 200 are not necessarily presented in any particular order and that performance of some or all the steps in an alternative order is possible and is contemplated.

The steps of the method 200 are presented in the demonstrated order for ease of description and illustration. Steps can be added, omitted and/or performed simultaneously without departing from the scope of the appended claims. It should also be understood that the illustrated method 200 can be ended at any time. In certain embodiments, some or all steps of this process, and/or substantially equivalent steps are performed by execution of computer-readable instructions stored or included on a computer-readable medium. For instance, the method may be performed by the processor 106 executing instructions stored in the memory 104 of the OBC 100 of the subject, or host vehicle 102. In a contemplated embodiment, a processor and a memory of a remote server (not shown) performs functions of the present invention, such as storing or evaluating track information.

A. Object Detection

Figure 3:
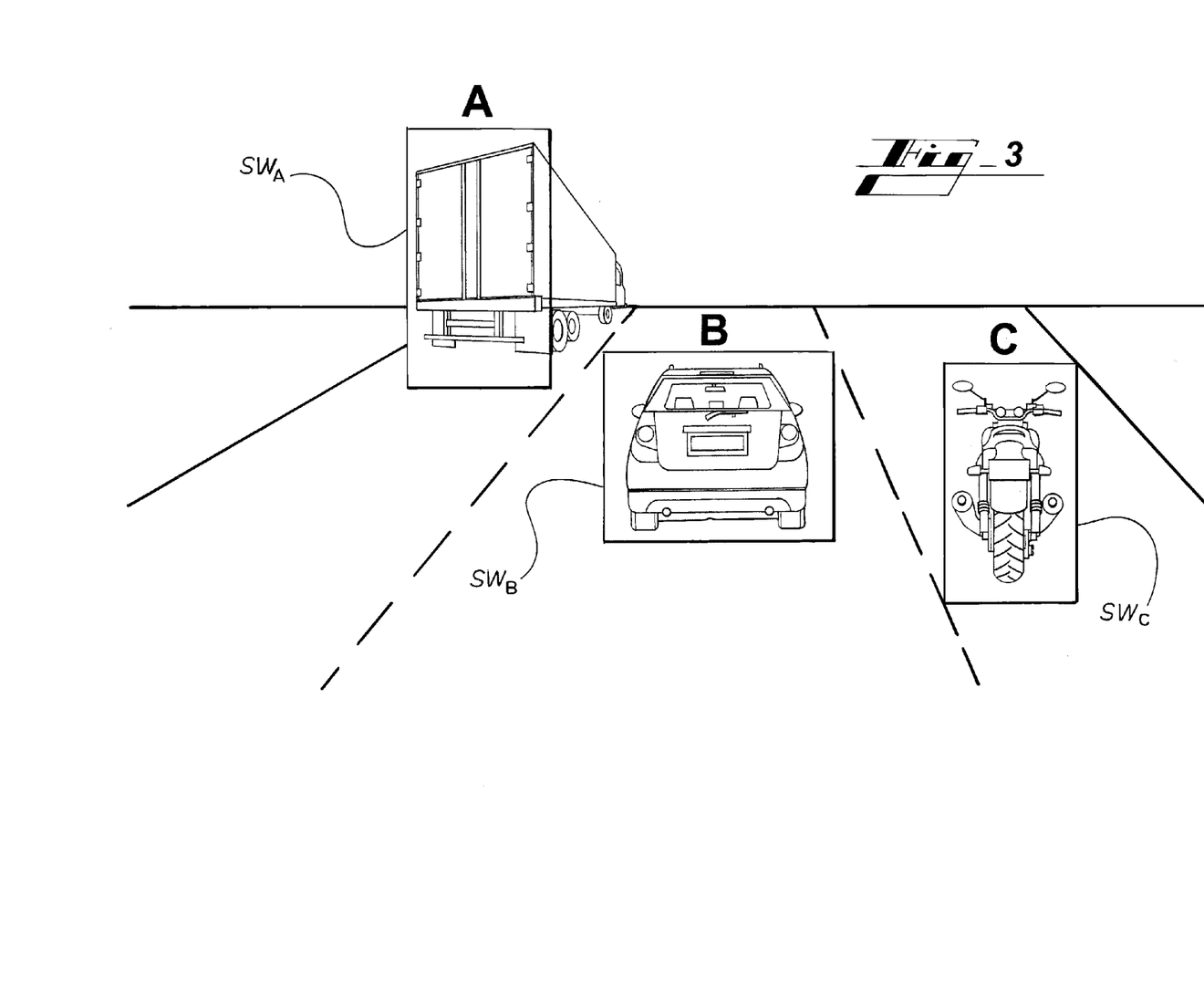
FIG. 3 illustrates an on-road scenario, according to an embodiment of the present disclosure.

The method 200 begins 201 and flow proceeds step 202 where the sensor sub-system 110 of the subject, host vehicle 102 senses an object, such as another vehicle. For purposes of illustration, FIG. 3 shows an exemplary scenario wherein three objects A, B, C precede the host vehicle on a highway. The illustrated objects A, B, C are a tractor trailer, a sports-utility vehicle, and a motorcycle, respectively.

In step 202, the camera 112 and/or the radar 114 initially sense the objects. In one embodiment, the method 200 is cued by the radar 114 first detecting the object. The method 200 is performed separately for each object A, B, C. In one embodiment, a Viola-Jones multi-object classifier, or other classifier, is cued by radar range data, such as a sensed road surface, a non-road object, or other salient object, results of analyzing edge histogram descriptors or other visual or image descriptors, and/or other trigger events.

B. Creating Search window for Object Search

At step 204, the processor 106 forms search windows enclosing respective objects A, B, C. Search windows can also be referred to as radar windows, or matched target windows. In FIG. 3, a search window $SW_A$, $SW_B$, and $SW_C$ is shown for each illustrated object A, B, C.

The size of each search window $SW_A$, $SW_B$, and $SW_C$ is a function of a distance from the host vehicle to the respective object. For example, with W denoting a width of a particular object (e.g., vehicle A, B, or C), and H denoting a height of the particular object, the search window size for the particular object can be represented by:

$$f_c \frac{W}{\xi} \text{ (pixels) by } f_c \frac{H}{\xi} \text{ (pixels)},$$

where $\xi$ is the longitudinal distance of the radar object and $f_c$ is a constant focal length of the camera, measured in pixels.

And with W and ξ both having units of linear distance (e.g., meters), the resulting size is measured in pixels.

In some embodiments, the search window is configured to enclose salient features such as corners and vertical edges.

C. Identify Object Type

With further reference to FIG. 2, at step 206, the processor 106 executes a classification algorithm, of the computer-readable instructions, for identifying a type of the detected object A, B, C. Objects types include, for example, car, motorcycle, tractor-trailer, and pedestrian.

Some classification algorithms implemented in the present methods detect unneeded background, such as environmental features (guard rails, trees, etc.) visible adjacent the target object. Once detected, the unneeded background can be removed my making the SW window smaller, such as to barely enclose the object A, B, C.

Once the object A, B, C is isolated, the processor 106 determines a type of the object based on characteristics such as size and shape, and in some embodiments, other characteristics, such as color.

For instance, the classification algorithm may include a Haar algorithm for isolating features in the window SW and an adaptive boosting (adabosting) algorithm for identifying features that best discriminate the objects A, B, C from the background. In one embodiment, an ensemble of weak, and therefore relatively efficient, detectors are cascaded to accelerate detection speed, where each classifier is a classifier such as an adaboosted classifier configured according to the following decision function:

$$F=\text{sign}(w_1 f_1 + w_2 f_2 + \ldots + w_n f_n)$$

where the sign function returns −1 (no object) if the number is less than 0, and +1 (object) if the number is positive. The binary feature value $f_i$ is defined as:

$$f_i = \begin{cases} +1, & v_i > T_i \\ -1, & \text{Otherwise.} \end{cases}$$

Here, $v_i$ is a scalar feature descriptor. When there is an object, $v_i > T_i$, and when there is not an object, $v_i \leq T_i$. $w_i$ represents a strength, or importance, of the feature $f_i$, affecting the determination of whether there is an object. All of the parameters (e.g., $w_i$ and $T_i$) can be, for example, learned from a labeled training dataset.

Figure 7:
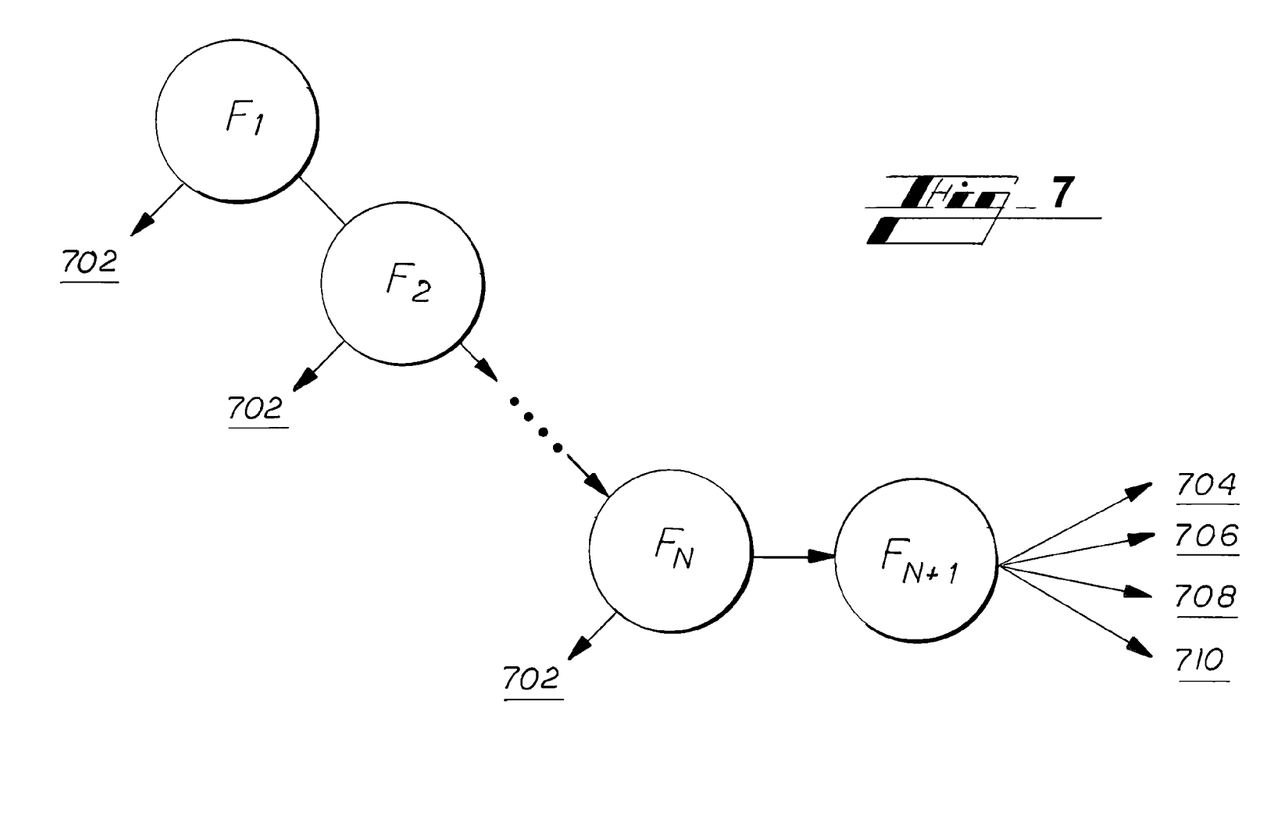
FIG. 7 illustrates schematically cascading classifiers according to an adaptive boost algorithm, according to an embodiment of the present disclosure.

As an example, FIG. 7 shows the classifier of various nodes. The last stage classifier recognizes a type of the object, such as automobile, motorcycle, tractor-trailer, pedestrian, etc. The classifier of each node $F_{1-(N+1)}$ may be tuned to a desired detection rate. For example, the classifier of each node can be tuned to a very high detection rate, at a cost of many false detection rate, whereby, for example, almost all (about 99.9%) of the objects are found, but many (about 50%) of the non-objects are erroneously detected at each node. With a many-layered cascaded classifier, such as a 20-layer cascaded classifier, the final detection rate is relatively high, such as in one example, $0.9^{9920}=98\%$, with a corresponding false-positive rate of only $0^{0.520}=0.0001\%$.

FIG. 7 shows by way of example return of a finding of no object 702 for an initial group of nodes $F_{1-N}$, and a return of an object finding regarding another node $F_{N+1}$. The finding of the other node $F_{N+1}$ may made with respect to, for instance, an automobile 704, motorcycle 706, pedestrian 708, or other objects 710.

D. Initialize Track and Add to Database

At step 208, the processor 106 initializes a new track with the radar and camera measurements for each new object A, B, C. For each object A, B, C, (r,c) denotes a location of the object. In some embodiments, the processor 106 uses a homography matrix Π to identify Cartesian coordinates of the object (x,y) in the host vehicle coordinate system as:

$$x = \frac{\tilde{x}}{s}, y = \frac{\tilde{y}}{s}, \begin{pmatrix} \tilde{x} \\ \tilde{y} \\ s \end{pmatrix} = \Pi^{-1} \begin{pmatrix} r \\ c \\ 1 \end{pmatrix}$$

Figure 4:
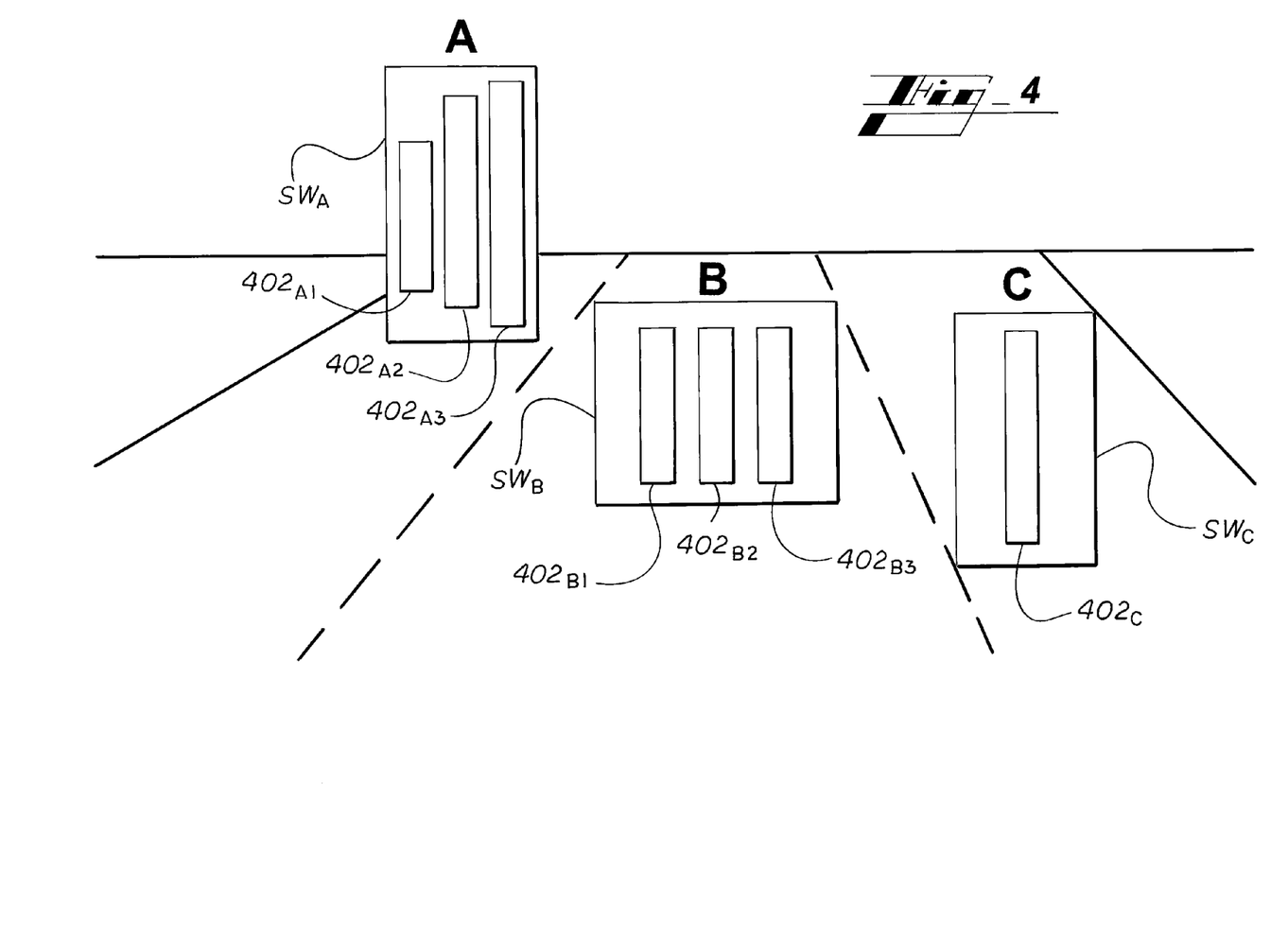
FIG. 4 illustrates a digital representation of vehicles of the on-road scenario of FIG. 3, according to an embodiment of the present disclosure.

Next, the processor 106 utilizes (x,y) to find a closest (ξ,η,v) to the detected target. Then, the processor 106 initializes a new track j as:

$T_j \leftarrow$ image patch of the detected target
$x_j \leftarrow \xi, y_j \leftarrow y, v_{xj} \leftarrow v, v_{yj} \leftarrow 0, a_{xj} \leftarrow 0$ The processor 106 applies an object detector to regions of the image where the objects were detected. In one embodiment, the processor 106, in doing so, generates one or more identifiers, such as vertical bars, representing each object. With further reference to the scenario of FIG. 3, FIG. 4 shows radar-detected object measurements 402 for the exemplary objects A, B, C. In some embodiments, multiple measurements 402 are generated for each larger object (A and B), and grouped together within the search window SW.

At step 210, the processor 106 adds the newly initialized track, including appearance attributes, radar object measurements 402, and kinematic attributes to the track database 118. Thereafter, the track will be available to the processor 106 as it tracks the objects A, B, C, as described below. The method 200 may end 211.

IV. Registration and Fusion

Figure 5:
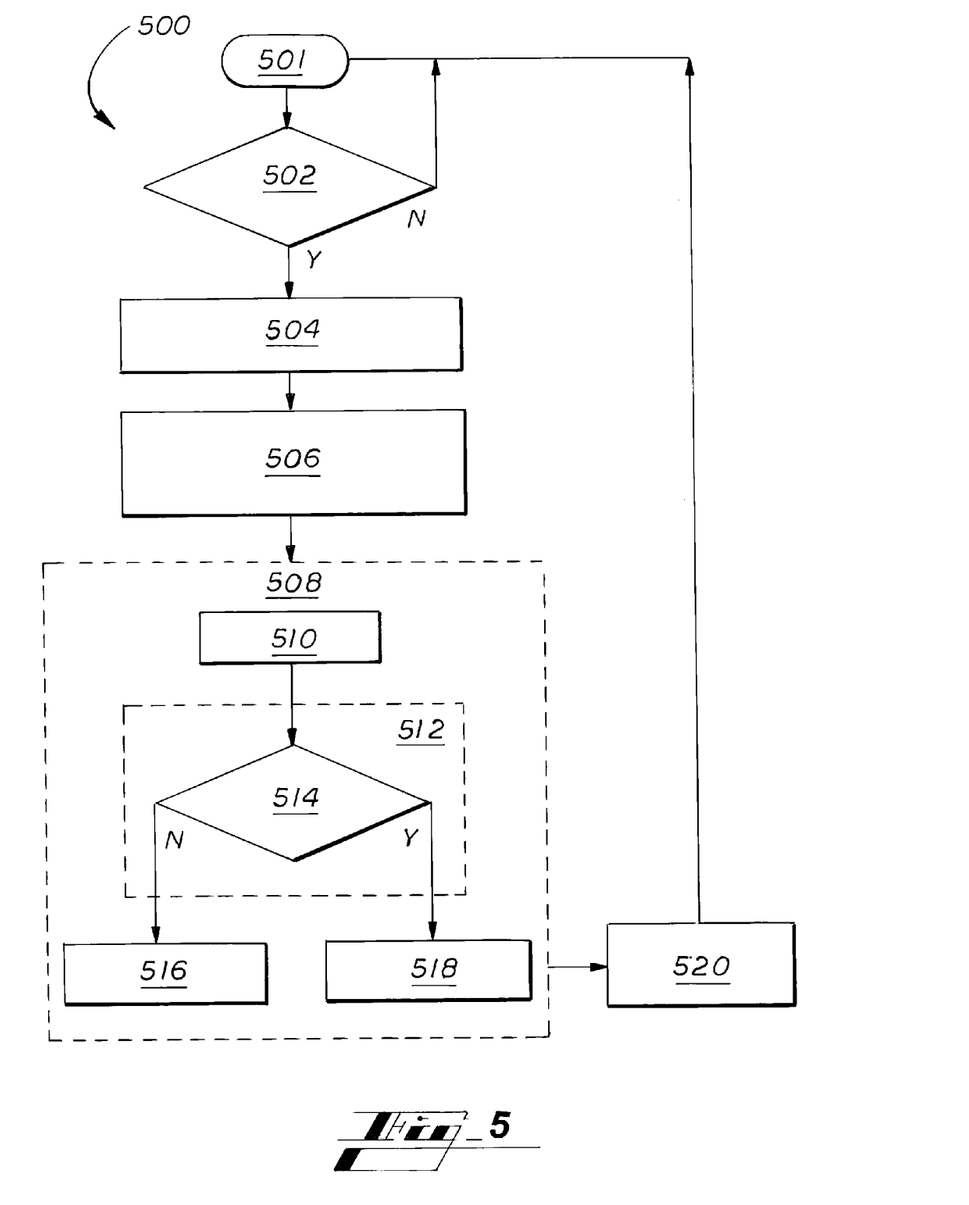
FIG. 5 illustrates a method for fusing camera and range sensor data for improved object detection and tracking, according to an embodiment of the present disclosure.

FIG. 5 show an exemplary method 500 for fusing camera and range sensor data for improved object detection and tracking, according to an embodiment of the present disclosure. It should be understood that the steps of the method 500 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps are performed by execution of computer-readable instructions stored or included on a computer-readable medium. For instance, as with the method 200 described in connection with FIG. 2, the method 500 of FIG. 5 may be performed by the processor 106 executing instructions stored in the memory 104 of the OBC 100 of the host vehicle 102. In a contemplated embodiment, a processor and a memory of a remote server (not shown) performs functions of the present invention, such as storing or evaluating the object track information described below.

A. Project Range Data into Image Plane

As shown in FIG. 5, the method 500 begins 501 and flow proceeds to step 502, whereat the processor 106 determines that new object data is available from the sensor sub-system 110 of the vehicle 102, such as from the camera 112 and/or the radar 114.

When new data is available for processing, flow proceeds to step 504, whereat the processor 106 registers the data. Registering the data includes obtaining radar data, in the form of data points, corresponding to one or more sensed objects, or "targets," and projecting, or overlaying, the radar data into a plane of an image from the camera, in the form of pixels.

A radar object can be represented, for example, by (i) a longitudinal offset from a reference point (such as a position of the sensing radar of the host vehicle), (ii) a lateral offset, and (iii) longitudinal velocity, $o_{Ri} = (\xi_i, \eta_i, v_i)$.

A corresponding pixel in the image plane for a bottom part (e.g., ground contact point) of the object can be computed according to the following linear projection, including a matrix multiplication:

$$u = Pr$$
$$P = K[Rt]$$
$$t = -R'r_0$$
$$R' = R \begin{bmatrix} \cos\alpha & 0 & -\sin\alpha \\ 0 & 1 & 0 \\ \sin\alpha & 0 & \cos\alpha \end{bmatrix}$$

where $u=[r_i, c_i, 1]^T$ and $r=[\xi_i, \eta_i, 0, 1]^T$ denote the row and column indices of the pixel and the ground contact point of the radar object, respectively. A camera calibration process is conducted to derive the following quantities: K (camera intrinsic parameters), R (rotation matrix), and $r_0$ (camera position in the vehicle frame). $\alpha$ denotes the vehicle pitch angle.

The vehicle pitch $\alpha$ in some applications represents an amount of pitch of the vehicle 102, such as from horizontal, with respect to a forward direction of the vehicle 102. The vehicle pitch $\alpha$ can be identified, or calibrated in an initial registration process, such as in connection with original manufacture of the vehicle 102. As described further below, the pitch angle $\alpha$ can be updated with iterations of the present method 500, to compensate for changes in pitch during operation of the vehicle 102, such as due to an unbalanced load, change in tire pressure, harsh braking, or acceleration.

In this way, given a list of radar objects (e.g., vertical bars 402 in FIG. 4) $\{(\xi_i, \eta_i, v_i) | i=1, \ldots, M\}$ where M is the number of objects, corresponding radar object pixels in the image plane can be determined as $\{(r_i, c_i) | i=1, \ldots, M\}$. Thus, if there are three objects A, B, C being analyzed per the example, the registration of step 504 includes three such predictions.

B. Predict Location and Appearance

At step 506, the processor 106 estimates an expected location and appearance of the objects A, B, C for the current time according to a prediction algorithm of the computer-readable instructions. With further reference to the exemplary scenario introduced in FIG. 3, FIG. 6 shows historic image tracks, or templates, for each of the three objects A, B, C.

Figure 6:
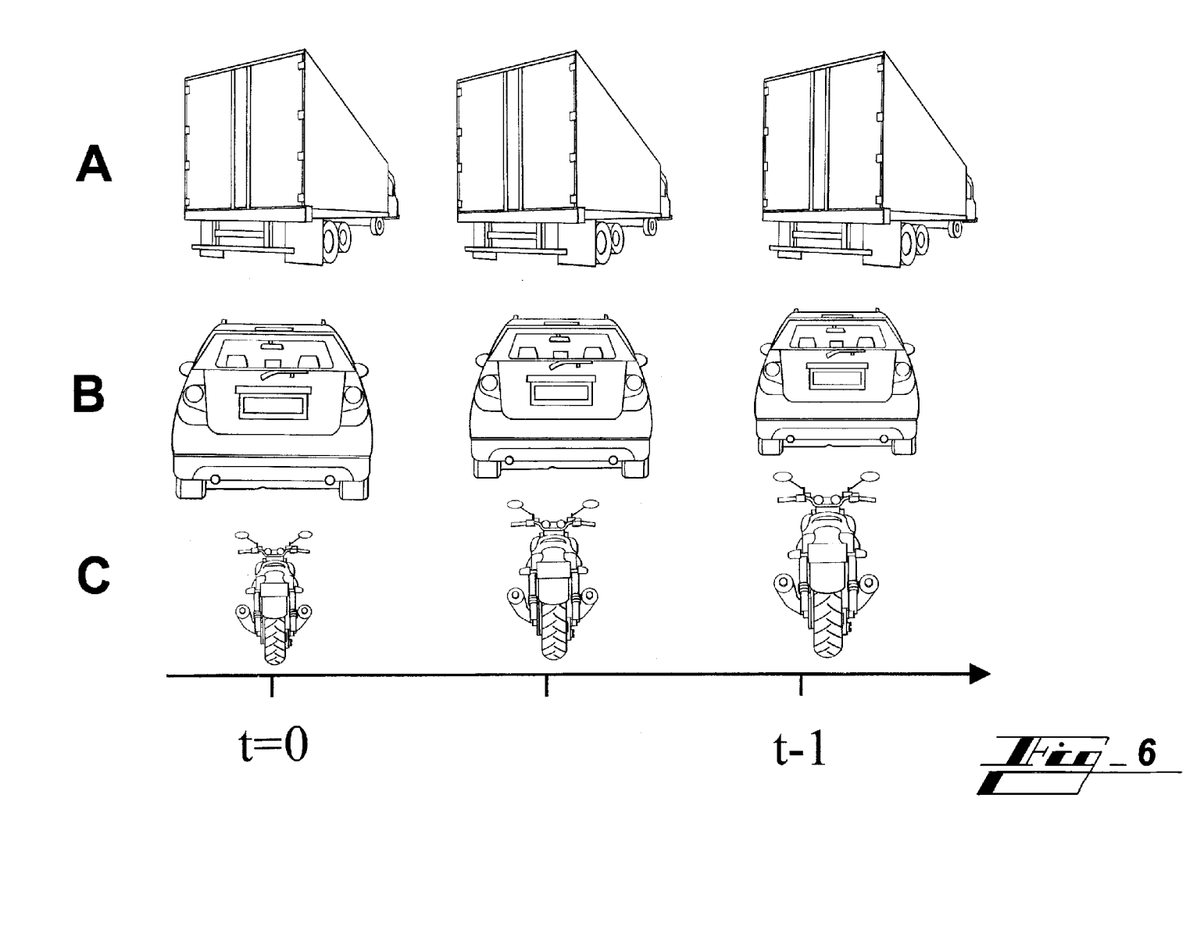
FIG. 6 illustrates historic image tracks for the vehicles of the on-road scenario of FIG. 3, according to an embodiment of the present disclosure.

As can be seen in FIG. 6, a distance separating the host vehicle 102 and the first object A is generally constant over the illustrated period (t=0 to t=−1), as indicated by the size of the object in the corresponding track being generally constant throughout the progression (t=−1, t=−0.5, t=0). A distance to the second object B is increasing, as can be seen by the corresponding image size decreasing in the track progressions. And, conversely, a distance to third object C can be seen to be decreasing.

The processor 106 considers continuity of motion for each object A, B, C. Here, the processor 106 estimates, for each object A, B, C, expected present kinematic characteristics (e.g., location, speed, acceleration) based on past kinematic characteristics for the object.

Each track is a target from previous time instances and represented by a list of attributes, including kinematic characteristics. For example, the attributes may be represented as:

$$(T_j, x_j, y_j, v_{xj}, v_{yj}, a_j, w_i, h_i)$$

where $T_j$ is the image patch (appearance) of the track, $(x_j, y_j)$ is the longitudinal and lateral distances (e.g., in a host-vehicle frame), respectively, $(v_{xj}, v_{yj})$ is the longitudinal and lateral velocities (e.g., in vehicle frame), $a_j$ is the longitudinal acceleration, and $w_i$ and $h_i$ are width and height of the object.

The height h represents a distance of the object frame from a top of the object to the ground. In some embodiments, the width w and height h are estimates corresponding to the object type (e.g., tractor-trailer, car, van) and/or a longitudinal distance to the object from the host vehicle 102. For example, for a certain object, height h may be fixed at, for instance, 2.5 meters in proportion to a longitudinal distance between the host vehicle 102 and the certain object.

The processor 106 computes a predicted track for the current time as follows:

$$T'_j = \text{rescale}\left(T_j, \frac{x'_j}{x_j}\right) \quad (1)$$
$$x'_j = x_j + v_{xj}\Delta T + \frac{1}{2}a_j\Delta T^2$$
$$y'_j = y_j + v_{xj}\Delta T$$
$$v'_{xj} = x_{xj} + a_j\Delta T$$
$$v'_{yj} = v_{yj}$$
$$a'_j = a_j$$

where the function rescale(T, v) rescales, or resizes, the image patch T by a factor v. The rescaling is based on a change in image size depending on a change in proximity to the object, such as when it is approaching or departing from the host vehicle 102. The acceleration $a_j$ is an acceleration in the longitudinal direction—i.e., straight ahead with respect to the host vehicle 102.

In this exemplary routine, process noise is not considered for simplicity of operation. In some embodiments, though, process noise is considered.

C. Motion Analysis

The processor 106 matches each predicted target in the image plane to the new observed image and radar data, such as in a bounded searching window enclosing the projected predicted target.

Reference number 508 represents a subroutine of the present algorithm, wherein the processor 106 analyzes motion for each object A, B, C in association with each corresponding track in the database 118. By this motion analysis, the method 500 refines the determined positions for the objects A, B, C by using template matching, such as in a bound searching window. In one embodiment, the motion analysis includes the following motion flow estimation technique, commencing at step 510, whereat each track is in turn obtained.

Thereafter, in a motion analysis step 512 the processor 106, for each object A, B, C, compares measurements for each available track stored in the track database 118 (e.g., appearance and kinematic characteristics) to the predicted track data (e.g., appearance and kinematic characteristics) to determine whether the predicted values bear at least a predetermined relationship (e.g., are similar within a predetermined threshold) to the measured values. This function of step 512 is referred to in FIG. 5 as step 514.

For the evaluation of step 512, the processor 106, in some embodiments, considers a cost, or criteria, function for matching, such as one represented by:

$$\sum_u (I_m(W(u,q)) - T'_j(u))^2 \qquad (2)$$

where $I_m$ is the sub-image, which in some applications is generally the same size as a template image patch in the searching window. The transformation W takes each pixel u in the coordinate frame of the template $T'_j$ and maps it to the sub-pixel location W(u,q) in the coordinate frame of the image $I_m$. The variable q denotes parameters of the transformation. The location of the image template (T) in the new image is measured by pixels. The cost function of the second equation (2) provided above is a relatively broader version, giving a general representation of cost compared to a more-specific cost function represented by a third equation (3), to be described below.

The processor 106 uses an affine transformation for tracking a relatively large image template can be represented as:

$$W(u, q) = \begin{pmatrix} 1+q_1 & q_3 & q_5 \\ q_2 & 1+q_4 & q_6 \end{pmatrix} \begin{pmatrix} r \\ c \\ 1 \end{pmatrix}$$

Translations for smaller templates can be represented by:

$$W(u, q) = \begin{pmatrix} r+q_5 \\ c+q_6 \end{pmatrix}$$

where $q_1$, $q_2$, $q_3$, and $q_4$ model a rotation and an aspect ratio change of the template, and $q_5$ and $q_6$ denote the translation, e.g., to the left and right, of the template. $q_5$ and $q_5$ are generally more relevant because they are more likely to change more with time, such as when a target vehicle or the host vehicle 102 is turning.

In one embodiment of the present disclosure, a primary goal of the motion analysis is to minimize a cost function, such as that of the second equation (2) described above, or the third equation (3), below. The third equation (3) is a sum of squared error between two images: the template $T'_j$ and the sub-image $I_m$ wrapped back onto the coordinate frame of the template.

$$q \leftarrow \begin{pmatrix} 1 & 0 & r' \\ 0 & 1 & c' \end{pmatrix}$$

is initialized for matching a relatively large image template, and $$q \leftarrow \begin{pmatrix} r' \\ c' \end{pmatrix}$$

is initialized for matching a smaller image template, where r' and c' are row and column indices, respectively, of the matched target in the new image.

The processor 106 can execute an algorithm such as the Lucas-Kanade algorithm, whereby it is assumed that a current estimate of q is known and then iteratively solved (e.g., in repetitive steps) for the parameter Δq. The Lucas-Kanada algorithm is a widely used method for differentially estimating optical flow. Thus, the expression is minimized with respect to Δq as follows:

$$\sum_u (I_m(W(u, q+\Delta q)) - T'_j(u))^2 \qquad (3)$$

As provided above, the third equation (3) is more specific than the generalized form of the second equation (2), wherein the Δq value of the third equation (3) is 0.

The parameters are updated, q←q+Δq, and the iteration is repeated until the estimates of the parameter q converge. In other words, q is updated and the equation reprocessed as Δq approaches 0, or a normative vector $\|\Delta q\| \leq \epsilon$, where epsilon $\epsilon$ is a predetermined relatively-small positive number. In this way, the observed target location in the new image is ($q_5$, $q_6$).

D. Sub-Space Analysis

It is noted that direct use of raw pixel data to represent target appearance, in some cases, has some limitations. For example, it is recognized that the appearance of a target may change markedly due to intrinsic appearance changes, such as a variation of pose or shape and/or extrinsic changes in appearance, such as due to changes in illumination, motion, viewpoint, and occlusion (i.e., the target object is at least partially blocked from view by an intervening object (e.g., an intervening vehicle)).

As such, in some embodiments, the present methods include features for modeling such appearance changes. In one particular embodiment, a subspace-based representation of target appearance is utilized in order to accommodate such changes while tracking.

S is a vector of the image for the object, otherwise referred to as a high-dimensional space. The vector S is spanned by K time instances, so that the linearly-independent image template prototypes are: $s_1, s_2, \ldots, s_K$. That is, the representation of the subspace S, represented by a projection matrix for the subspace S=span ($s_1, s_2, \ldots s_k$), is: S=[$s_1, s_2, \ldots, s_K$].

For an image patch I, the projection on the subspace S can be represented by a linear combination of the basis vectors, i.e., $\hat{I} = c_1 s_1 + c_2 s_2 + \ldots + c_K s_K = Sc$ such that the distance $\|I - \hat{I}\|^2$ is minimized. Using a least squared approach, a solution of c can be determined by solving the following linear equation whereby a subspace matrix is multiplied by $c_1 \ldots c_k$:

$$\begin{pmatrix} s_1^T s_1 & s_1^T s_2 & \ldots & s_1^T s_K \\ s_2^T s & s_2^T s_2 & \ldots & s_2^T s_K \\ \vdots & \vdots & \ddots & \vdots \\ s_K^T s_1 & s_L^T s_2 & \ldots & s_K^T s_K \end{pmatrix} \begin{pmatrix} c_1 \\ c_2 \\ \vdots \\ c_K \end{pmatrix} = \begin{pmatrix} s_1^T I \\ s_2^T I \\ \vdots \\ s_K^T I \end{pmatrix}$$

These equations can be represented in short form as $Ac_j = S^T I$ and, thus, $c_j = A^{-1} S^T I$.

In some embodiments, the subspace S will have generally about ten dimensions, or vectors. These dimensions include typical views not including, for example, side views. Some views can be combined, or grouped, to form one or more of the included dimensions.

In one embodiment, the third, cost function equation (3) is redefined for matching in the subspace as a Euclidean distance in the subspace S, as follows:

$$\|c_{I_m(W(u,q+\Delta q))} - c_{T'_j(u)}\|^2 = \|A^{-1}S^T I_m(W(u, q+\Delta q)) - c_{T'_j(u)}\|^2 \approx$$
$$\left\|c_{I_m(Q(u,q))} - c_{T'_j(u)} + A^{-1}S^T \nabla I_m \frac{\partial W}{\partial q}\Delta q\right\|^2$$

The subspace S evolves with changes of appearance of the target object. A partial derivative of the above expression with respect to $\Delta p$ is taken, and, with it equaling 0, the increments to the parameters can be represented as:

$$\Delta q = B^{-1}\left[A^{-1}S^T \nabla I_m \frac{\partial W}{\partial q}\right]^T [c_{I_m(W(u,q))} - c_{T'_j(u)}]$$
$$B = \left[A^{-1}S^T \nabla I_m \frac{\partial W}{\partial q}\right]^T \left[A^{-1}S^T \nabla I_m \frac{\partial W}{\partial q}\right]$$

E. Non-Matching Track

When there is not an iterative solution whereby q converges as desired, and the norm $\|c_{I_m(W(u,q))} - c_{T'_j(u)}\|^2$ is not less than a threshold, there is not a match between the predicted data for a particular target object and the present measurements for the particular target object.

If the iterations do not lead to a satisfactory value for q in step 514, such as would occur if the target object exited the road, flow proceeds to step 516 whereat the subject track, no longer being applicable or reliable, is deleted from the track database 118. For instances in which a match does not exist because a new object is being detected, such as when a new target has merged into the road ahead of the host vehicle 102, a new track is initialized, as described above in connection with the method 200 described in connection with FIG. 2.

In this case, flow with respect to the particular object proceeds to step 516 wherein the measured data is removed from the track database 118. Particularly, in removing the measured data from the track database 118, the processor removes the image patch $T_j$ from the track database 118 with respect to the particular target object.

F. Matching Track

When the iterative solution of q converges as desired, the norm $\|c_{I_m(W(u,q))} - c_{T'_j(u)}\|^2$ will be less than the threshold. In this case, there is a match between the predicted data for a particular target object and the present measurements/observations for the particular target object, and flow with respect to the particular object proceeds to step 518 wherein the measured data is saved in the track database 118 as a new track in connection with the particular object.

In other words, for each track $T_j$ that matches the new observed image $I_m(W(u,q))$, transformed to the coordinate frame of the image $I_m$, the processor 106 updates the appearance and kinematic characteristics (e.g., position, velocity, and acceleration) by adding a new track to the database 118.

One benefit of updating the database 118 is that the increased store of accurate information for consideration improves the overall process of tracking objects, thus allowing for generation of more accurate information about the environment of the vehicle 102. More accurate information about the environment of the vehicle 102 can be very useful for active safety-related and other vehicle operations. Exemplary active safety systems that can benefit from accurate environment information include adaptive cruise control (ACC), collision preparation system (CPS), rear cross-traffic collision avoidance systems (RCTCA), lane change warning systems (LCW). Processes for updating the appearance and kinematic characteristics in step 518 are now described in more detail.

1. Appearance Update

The following exemplary process utilizes the subspace concept introduced above, and particularly includes updating a subspace S corresponding to the j-th track. In a first step, the processor 106 initializes a basis vector set to be empty. Vectors for the track are in some embodiments represented by $s_1$, $s_2$, ..., $s_K$ representing pixel values for the target object A, B, C, such as position, brightness, color of the target object A, B, C, in a first K time instances.

After the processor 106 processes the first K time instances, the processor 106 employs update rules. In the following description, $I_m$ is a new appearance of the target object A, B, C, corresponding to the current time instance. The processor 106 determines a base vector $s_m$ best matching $I_m$ in cosine similarity; in other words, where $$m = \underset{k}{\operatorname{argmax}} \frac{s_k^T I_m}{\|s_k\|\|I_m\|}.$$

Variable $s_m$ is updated according to the relationships:

$$s_m \leftarrow \frac{n-1-l}{n} s_m + \frac{l+1}{n}\left(I_m - \frac{(I_m^T s_m)s_m}{\|s_m\|}\right)$$

where n is the number of instances that the target object A, B, C is observed. l refers to an amnesia, or forgetting, factor, which moderates a balance between old and new appearances. The amnesia factor l own-weights contribution of earlier observation. For example, when tracking a target with changing appearance, recent observations will likely be more indicative of actual appearance than more distant observation. In some implementations, the amnesia factor l is set to zero, else a relatively-small number, for a first several tracking cycles. Once the target is tracked for a relatively-large number of cycles, the factor l is increased with the number of cycles going forward.

The base vectors other than $s_m$ in some embodiments, remain unchanged.

2. Kinematics Update

The following exemplary process is for updating kinematic attributes of the j-th target, namely, longitudinal distance ($x_j$), lateral distance ($y_j$), longitudinal velocity ($v_{xj}$), lateral velocity ($v_{yj}$), and longitudinal acceleration ($a_{xj}$). The kinematical attributes can collectively be represented by the following state vector:

$$x = [x_j, y_j, v_{xj}, v_{yj}, a_{xj}]$$

A distance between the i-th radar object and j-th radar object in the database 118 can be represented by:

$$d(i, j) = \frac{|x'_j - \xi_i|}{\sigma_x} + \frac{|y'_j - \eta_i|}{\sigma_y} + \frac{|v'_{xj} - v_i|}{\sigma_v}$$

where $\sigma_x$, $\sigma_y$, and $\sigma_z$ are predefined parameters used to tune a size of the matching region. Given a list of radar objects $\{o_{Ri} = (\xi_i, \eta_i, v_i) | 1, \ldots, M\}$, the m-th object associates to the target j if the following two conditions are met:

$$d(m,j)<1 \quad (1)$$

$$d(m,j) \leq \min/i\ d(i,j) \quad (2)$$

This association process is configured to build correspondence between the radar measurements (e.g., vertical bars 402 in FIG. 4) and the tracked targets (e.g., rectangles A, B, and C in FIG. 4).

For simplified description, it is assumed that only one radar object measurement is associated with the j-th target. The process (treating the single radar measurement case) can easily be extended to cases in which multiple radar objects are associated to a single target. This extension includes adding a measurement equation for each associated radar measurement.

With $o_{R\kappa_j}$ denoting an associated radar object, where $\kappa_j$ is a radar object index associated with the j-th target, a radar measurement model (or radar measurement) can be written as:

$$\xi_{\kappa_j} = x_j + w_\xi, \eta_{\kappa_j} = y_j + w_\eta, v_{\kappa_j} = v_{xj} + w_{vx}$$

In short form, the radar measurement model can be represented as:

$$o_{R\kappa_j} = h_R(x_j) + w_R \quad (4)$$

where $W_R$ denotes a white Gaussian measurement noise vector with a zero mean with respect to the radar 114.

The motion flow parameters $(q_5, q_6)$ estimated in the motion analysis 512 can be used for target position estimation. With $\Pi = [\pi_1^T, \pi_2^T, \pi_3^T]^T$ denoting a homography that maps one-to-one from a ground plane to an image plane, the homography for a calibrated camera can be represented as:

$$\Pi = \begin{bmatrix} p_{11} & p_{12} & p_{14} \\ p_{21} & p_{22} & p_{24} \\ p_{31} & p_{32} & p_{34} \end{bmatrix}$$

where the quantities $p_{ij}$, i=1, ..., 3 and j=1, ..., 4 are elements of the projected matrix P.

With $(q_5, q_6)$ denoting the pixel indices of the ground point of the target object at a previous time instance, the processor 106 can verity that:

$$q_5 = \frac{(x, y, 1)^T \pi_1}{(x, y, 1)^T \pi_3}, q_6 = \frac{(x, y, 1)^T \pi_2}{(x, y, 1)^T \pi_3},$$

or, in short form:

$$o_{cam} = h(x_j) + w_{cam} \quad (5)$$

where $w_{cam}$ denotes the white Gaussian measurement noise vector with a zero mean with respect to the camera 112.

Based on the first, fourth, and fifth equations (1), (4), (5), above, the processor 106 can employ a filter, such as an Extended Kalman Filter (EKF), to estimate a state vector x (i.e., $x = [x_j, y_j, v_{xj}, v_{yj}, a_{xj}]$). The state vector x is added to the database 118 as the kinematic attributes of the new track.

V. Updating Vision Registration Parameter

At step 520, the processor 106 updates one or more vehicle parameters affecting measurements of the camera 112 and/or the radar 114. As an example, in some embodiments, the processor 106 at step 520, updates a vehicle pitch angle $\alpha$ associated with the host vehicle 102.

The camera 112 may be very sensitive to pitch changes, which can occur for various reasons, such as load changes, braking, tires pressure changes. The radar is likely not so sensitive to pitch change.

Also, the camera 112 and the radar 114 are in some embodiments mounted in different positions and a distance offset between the camera 112 and the radar 114 may change, such as if a position of the camera 112 changes due to changes in mounting hardware, such as resulting from temperature changes.

The processor 106 uses matched radar objects and image templates to estimate changes in vehicle parameters, such as camera pitch angle changes, for example. In the functions below, $(\xi_{\kappa_j}, \eta_{\kappa_j})$ denotes the j-th target position measured by radar, $(q_{5j}, q_{6j})$ denotes the target's pixel indices in the image estimated by template matching, and $(r_j, c_j)$ denotes the projection of radar measurement in the image plane. The term $q_{5j}$ can be referred to as a motion analysis measurement. The term $r_j$ can be referred to as a radar object projection. With these variables, a row index of the target can be expressed as:

$$q_{5j} = h(\xi_{\kappa_j}, \eta_{\kappa_j}, \alpha + \Delta\alpha) + w_{rj} \quad (6)$$

where it is assumed that the camera pitch angle is skewed, or deviated, from the nominal value $\alpha$ by $\Delta\alpha$, and where $w_{rj}$ is a measurement noise scalar with a mean and a variance of 0 and $\sigma_{rj}^2$. This sixth equation (6) can be linearized as:

$$q_{5j} = h(\xi_{\kappa_j}, \eta_{\kappa_j}, \alpha) + \frac{\partial h}{\partial \alpha} \Delta\alpha$$

$$= r_j + \frac{\partial h}{\partial \alpha}\bigg|_{\xi_{\kappa_j}, \eta_{\kappa_j}, \alpha} \Delta\alpha$$

Therefor, $$\frac{\partial h}{\partial \alpha}\bigg|_{\xi_{\kappa_j}, \eta_{\kappa_j}, \alpha} \Delta\alpha = q_{5j} - r_j.$$

Combining all tracks and using a theorem such as the Markov-Gaussian theorem, the processor 106 obtains the estimate of $\Delta\alpha$ as follows:

$$\Delta\alpha = \left(\sum_j \frac{\beta_j^2}{\sigma_j^2}\right)^{-1} \left(\sum_j \frac{\beta_j(q_{5j} - r_j)}{\sigma_j^2}\right)$$

where $$\beta_j = \frac{\partial h}{\partial \alpha}\bigg|_{\xi_{\kappa_j}, \eta_{\kappa_j}, \alpha}.$$

The variable $\beta$ is a derivative of h with respect to initial pitch angle $\alpha$.

The processor then updates the pitch angle as:

$$\alpha \leftarrow \alpha \Delta\alpha$$

wherein $\alpha$ is an initial pitch angle, or a previously updated value, and $\Delta\alpha$ is the present calibration value. If $\Delta\alpha$ is 0, then the pitch angle $\alpha$ does not need to be updated, or does not need to be further updated.

VI. Conclusion

The methods and systems of the present disclosure enable fusion of data from a vehicle-mounted radar and camera, allowing the vehicle to take advantage of the accurate lateral-positioning qualities of the camera and accurate longitudinal distance measurements of the radar. Moreover, false-detection rates are reduced, as previous tracks for the objects, including appearance and kinematic attributes are used to predict present attributes and compared to present vehicle sensing system measurements.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for fusing camera data and range sensor data received from a sensor subsystem of a vehicle to track an external object, comprising:
   determining, by an on-board computer of the vehicle, that that new object data corresponding to the object is available based on input received from the sensor sub-system of the vehicle, wherein the new object data comprises radar data, from a range sensor of the sensor subsystem, in the form of data points corresponding to the object; and an image, from a camera, of the sensor subsystem, in the form of pixels;
   registering, by the on-board computer, the new object data, wherein registering the data comprises obtaining the radar data and projecting the radar data into a plane of the image from the camera;
   estimating, by the on-board computer, an expected location and an expected appearance for the object according to a prediction algorithm to generate a predicted track corresponding to the object; and
   analyzing, by the on-board computer, motion for the object including comparing the predicted track with any existing track associated with the object and stored in a database of the on-board computer;
   wherein:
      a base pixel, of the pixels of the camera image, is in the plane of the image corresponding to a bottom part of the object, and is computed according to a linear projection including a matrix multiplication; and
      the linear projection including the matrix multiplication is represented by:

$$u = Pr$$
$$P = K[Rt]$$

$$t = -R'r_0$$

$$R' = R\begin{bmatrix} \cos\alpha & 0 & -\sin\alpha \\ 0 & 1 & 0 \\ \sin\alpha & 0 & \cos\alpha \end{bmatrix},$$

$u=[r_i,c_i,1]^T$ denotes a row index and a column index of the base pixel;
K represents parameters intrinsic to the camera;
R represents a rotation matrix;
$r_0$ represents a position of the camera in a vehicle frame;
$r=[\xi_i,\eta_i,0,1]^T$ denotes a ground contact point of the object; and
α denotes a pitch angle of the vehicle.

2. The method of claim 1, further comprising generating the predicted track corresponding to the object.

3. The method of claim 1, wherein the radar data ($o_{Ri}$) from the range sensor includes:
   (i) a longitudinal offset ($\xi_i$) from a reference point;
   (ii) a lateral offset ($\eta_i$); and
   (iii) longitudinal velocity($v_i$).

4. The method of claim 1, wherein registering the new object data includes performing a camera calibration process and determining radar object pixels in the plane of the image.

5. The method of claim 1, wherein estimating the expected location and appearance for the object according to the prediction algorithm includes estimating, for the object, expected present kinematic characteristics based on past kinematic characteristics for the object.

6. The method of claim 1, wherein:
   the on-board computer comparing the predicted track to the existing track includes the on-board computer considering a criteria matching function represented by:

$$\sum_u (I_m(W(u,q)) - T'_j(u))^2$$

$I_m$ is the sub-image;
$T'_j$ is a template;
W is a transformation;
u is a pixel of the image in a coordinate frame of the template $T'_j$;
W(u,q) is a sub-pixel location in the coordinate frame of the image $I_m$; and
q denotes a parameter of the transformation.

7. The method of claim 6, wherein the on-board computer analyzing motion for the object further includes:
   (a) executing a differential process for estimating optical flow using a current estimate of the transformation parameter q;
   (b) solving for a change parameter Δq;
   (c) updating q according to q←q+Δq;
   (d) repeating steps (a)-(c) until q converges as desired, wherein q has converged as desired if one of:
      Δq approaches 0; and
      Δq approaches a normative vector ||Δq||≤ϵ, where epsilon ϵ is a relatively-small predetermined positive-number.

8. The method of claim 7, wherein:
   the on-board computer analyzing motion for the object further includes:
      in response to q converging as desired, updating the track database to include the new object data as a new track associated with the object, including updating an appearance and kinematic characteristics associated with the object in the database; and in response to q not converging as desired, deleting the existing track associated with the object from the database; and if there is no existing track associated with the object to which the on-board computer can compare the existing track, the on-board computer initializes a new track to be associated with the object and stores the new track in the database in connection with the object.

9. The method of claim 8, further comprising the on-board computer updating one or more vehicle parameters affecting measurements of the camera and/or the radar using an error between a new search window and the predicted track projected onto the plane of the image.

10. A vehicle, configured to track an object external to the vehicle, comprising:
a camera;
a range sensor; and
an on-board computer including:
a processor; and
a computer-readable medium comprising instructions that, when executed by the processor, cause the processor to perform steps including:
determining that new object data corresponding to the object is available based on input received from the sensor sub-system of the vehicle, wherein the new-object data comprises radar data from the range sensor in the form of data points corresponding to the object; and an image from the camera in the form of pixels;
registering the new object data, wherein registering the data comprises obtaining the radar data and projecting the radar data into a plane of the image from the camera;
estimating an expected location and an expected appearance for the object according to a prediction algorithm to generate a predicted track corresponding to the object; and
analyzing motion for the object including comparing the predicted track with any existing track associated with the object and stored in a database of the on-board computer;
wherein:
a base pixel, of the pixels of the camera image, is in the plane of the image corresponding to a bottom part of the object, and is computed according to a linear projection including a matrix multiplication; and
the linear projection including the matrix multiplication is represented by:

$$u = Pr$$
$$P = K[R\ t]$$
$$t = -R'r_0$$
$$R' = R\begin{bmatrix} \cos\alpha & 0 & -\sin\alpha \\ 0 & 1 & 0 \\ \sin\alpha & 0 & \cos\alpha \end{bmatrix},$$

$u=[r_i,c_i,1]^T$ denotes a row index and a column index of the base pixel;
K represents parameters intrinsic to the camera;
R represents a rotation matrix;
$r_0$ represents a position of the camera in a vehicle frame;
$r=[\xi_i,\eta_i,0,1]^T$ denotes a ground contact point of the object; and
$\alpha$ denotes a pitch angle of the vehicle.

11. The vehicle of 10, wherein the operation of estimating the expected location and appearance for the object comprises computing a predicted track corresponding to the object.

12. The vehicle of 10, wherein:
the operation of comparing the predicted track to the existing track comprises processing a criteria matching function represented by:

$$\sum_u (I_m(W(u, q)) - T'_j(u))^2;$$

$I_m$ is the sub-image;
$T'_j$ is a template;
W is a transformation;
u is a pixel of the image in a coordinate frame of the template $T'_j$;
W(u,q) is a sub-pixel location in the coordinate frame of the image $I_m$; and
q denotes a parameter of the transformation.

13. The vehicle of 12, wherein the operations of analyzing motion for the object comprises:
(a) executing a differential process for estimating optical flow using a current estimate of the transformation parameter q;
(b) solving for a change parameter $\Delta q$;
(c) updating q according to $q \leftarrow q+\Delta q$;
(d) repeating steps (a)-(c) until q converges as desired, wherein q has converged as desired if one of:
$\Delta q$ approaches 0; and
$\Delta q$ approaches a normative vector $\|\Delta q\| \le \epsilon$, where epsilon $\epsilon$ is a relatively-small predetermined positive-number.

14. The vehicle of 13, wherein:
the operation of analyzing motion for the object comprises:
updating, in response q converging as desired, the track database to include the new-object data as a new track associated with the object, including updating an appearance and kinematic characteristics associated with the object in the database; and
deleting, in response to q not converging as desired, the existing track associated with the object from the database; and
initializing, if there is no existing track associated with the object to which the on-board computer can compare the existing track, a new track to be associated with the object and stores the new track in the database in connection with the object.

15. The vehicle of 14, wherein the operations further comprises updating one or more vehicle parameters affecting measurements of the camera and/or the radar using the new-object data and the predicted track.

16. A computer-readable storage device comprising instructions that, when executed by a processor, cause the processor to perform operations comprising:
determining that new object data corresponding to the object is available based on input received from the sensor sub-system of the vehicle, wherein the new object data comprises radar data from a range sensor, of the sensor sub-system, in the form of data points corresponding to the object, and an image from a camera, of the sensor sub-system, in the form of pixels;

registering the new object data, wherein registering the data comprises obtaining the radar data, and projecting the radar data into a plane of the image from the camera;

estimating an expected location and an expected appearance for the object according to a prediction algorithm to generate a predicted track corresponding to the object; and analyzing motion for the object including comparing the predicted track with any existing track associated with the object and stored in a database of the on-board computer;

wherein:
a base pixel, of the pixels of the camera image, is in the plane of the image corresponding to a bottom part of the object, and is computed according to a linear projection including a matrix multiplication; and
the linear projection including the matrix multiplication is represented by:

$$u = Pr$$
$$P = K[R\ t]$$
$$t = -R'r_0$$
$$R' = R\begin{bmatrix} \cos\alpha & 0 & -\sin\alpha \\ 0 & 1 & 0 \\ \sin\alpha & 0 & \cos\alpha \end{bmatrix},$$

$u=[r_i,c_i,1]^T$ denotes a row index and a column index of the base pixel;
K represents parameters intrinsic to the camera;
R represents a rotation matrix;
$r_0$ represents a position of the camera in a vehicle frame;
$r=[\xi_i,\eta_i,0,1]^T$ denotes a ground contact point of the object; and
α denotes a pitch angle of the vehicle.

17. The computer-readable storage device of claim 16, wherein the operation of comparing the predicted track to the existing track comprises:
processing a criteria matching function;
(a) executing a differential process for estimating optical flow using a current estimate of a transformation parameter q;
(b) solving for a change parameter Δq;
(c) updating q according to q←q+Δq;
(d) repeating steps (a)-(c) until q converges as desired, wherein q has converged as desired if one of:
Δq approaches 0; and
Δq approaches a normative vector ‖Δq‖≤ϵ, where epsilon ϵ is a relatively-small predetermined positive-number;
updating, in response q converging as desired, the track database to include the new object data as a new track associated with the object, including updating an appearance and kinematic characteristics associated with the object in the database; and
deleting, in response to q not converging as desired, the existing track associated with the object from the database;
wherein if there is no existing track associated with the object to which the on-board computer can compare the existing track, the on-board computer initializes a new track to be associated with the object and stores the new track in the database in connection with the object.

18. The computer-readable storage device of claim 16, wherein the operations further comprise updating one or more vehicle parameters affecting measurements of the camera and/or the radar using the new object data and the predicted track.

* * * * *